United States Patent
Jenkins et al.

(10) Patent No.: US 11,922,192 B2
(45) Date of Patent: Mar. 5, 2024

(54) ENHANCING SERVER VIRTUALIZATION THROUGH HOST SESSIONS

(71) Applicant: International Business Machines Corporation, Armonk, NY (US)

(72) Inventors: Jana H. Jenkins, Raleigh, NC (US); Marian I Tataru, Cedar Park, TX (US); Jeremy R. Fox, Georgetown, TX (US); Laurentiu Gabriel Ghergu, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 17/644,226

(22) Filed: Dec. 14, 2021

(65) Prior Publication Data
US 2023/0185589 A1 Jun. 15, 2023

(51) Int. Cl.
*G06F 9/451* (2018.01)
*G06F 3/14* (2006.01)
*G06F 9/455* (2018.01)

(52) U.S. Cl.
CPC .......... *G06F 9/452* (2018.02); *G06F 9/45558* (2013.01); *G06F 3/1454* (2013.01); *G06F 2009/45595* (2013.01)

(58) Field of Classification Search
CPC .......... G06F 9/452; G06F 2009/45595; G06F 3/1454–1462; G06F 3/048; G06F 9/45533–45558
See application file for complete search history.

(56) References Cited

U.S. PATENT DOCUMENTS

| 6,437,803 B1 | 8/2002 | Panasyuk |
| 6,603,492 B1 | 8/2003 | Sakaguchi |

(Continued)

FOREIGN PATENT DOCUMENTS

| CA | 2333279 C | 10/2005 |
| EP | 2854013 B1 | 1/2021 |
| IN | 225224 A1 | 11/2008 |

OTHER PUBLICATIONS

Parnala, Adam. Fullscreen, Windowed, and Borderless Mode: Which should you use? noypigeeks.com Aug. 29, 2020. <https://www.noypigeeks.com/computers/fullscreen-windowed-borderless-mode/>> (Year: 2020).*
Thoms, Steven. Plugins: Pros and Cons. InsaneProgramming.be. Nov. 23, 2021. <https://www.insaneprogramming.be/plugins-pros-and-cons/> (Year: 2021).*

(Continued)

*Primary Examiner* — Liang Y Li
(74) *Attorney, Agent, or Firm* — Joseph P. Curcuru

(57) ABSTRACT

In an approach to enhancing server virtualization through host sessions by re-screening a remote desktop session of a target virtual machine. Embodiments, identify, on a computer system, an open remote desktop window corresponding to the remote desktop session, and determine, by the computer system, whether one or more second remote desktop windows are embedded in the open remote desktop window. Further, embodiments identify, from the one or more second remote desktop windows, a target remote desktop window associated with the target virtual machine and generate an overlay on the open remote desktop window based on the identification of the target remote desktop window associated with the target virtual machine. Additionally, embodiments capture activity on a remote desktop screen associated with the generated overlay, and executes the captured activity on the generated overlay.

20 Claims, 6 Drawing Sheets

(56) References Cited

U.S. PATENT DOCUMENTS

| | | | |
|---|---|---|---|
| 9,032,325 | B2 | 5/2015 | Janssen |
| 9,300,638 | B2 | 3/2016 | Fink |
| 9,317,195 | B1* | 4/2016 | Grechishkin ....... G06F 3/04842 |
| 9,600,326 | B2 | 3/2017 | Kimura |
| 10,579,241 | B2 | 3/2020 | Gross |
| 10,740,414 | B2* | 8/2020 | Balz ................... G06F 16/9566 |
| 2007/0174410 | A1 | 7/2007 | Croft |
| 2012/0324365 | A1* | 12/2012 | Momchilov ............ H04L 67/01 |
| | | | 715/738 |
| 2016/0044088 | A1 | 2/2016 | Momchilov |
| 2019/0098096 | A1 | 3/2019 | Mocanu |
| 2020/0137140 | A1* | 4/2020 | Laukkanen .............. G09G 5/14 |
| 2020/0142571 | A1* | 5/2020 | Gross .................. G06F 3/04845 |
| 2022/0113991 | A1* | 4/2022 | Singh ................... G06K 9/6253 |
| 2022/0385699 | A1* | 12/2022 | Gupta .................. H04L 67/141 |

OTHER PUBLICATIONS

Asanga, G.D.D, "Public Key and Multi Factor Based Centralized SSH Authentication System for a Cloud Based Environment Using LDAP", A dissertation submitted for the Degree of Master of Science in Information Security, University of Colombo School of Computing, 2016, 74 pages.

Renker et al., "Deploying slurm on xt, xe, and future Cray systems", Cray User Group 2011, 11 pages.

Disclosed Anonymously, Remote Desktop Virtualization System and Method for Robotic Process Automation, IP.com Prior Art Database Technical Disclosure, IP.com No. IPCOM000266987D, Sep. 10, 2021, 8 pages.

International Search Report and Written Opinion for International Application No. PCT/EP2022/085009 dated Mar. 23, 2023, 18 pages.

\* cited by examiner

ENHANCING SERVER VIRTUALIZATION THROUGH HOST SESSIONS

BACKGROUND OF THE INVENTION

The present invention relates generally to the field of virtualization, and more particularly to re-screening a remote desktop session of a target virtual machine.

A bastion host is a special-purpose computer on a network specifically designed and configured to withstand attacks. The computer generally hosts a single application or process, for example, a proxy server or load balancer, and all other services are removed or limited to reduce the threat to the computer. It is hardened in this manner primarily due to its location and purpose, which is either on the outside of a firewall or inside of a conflict zone and usually involves access from untrusted networks or computers. These computers are also equipped with special networking interfaces to withstand high-bandwidth attacks through the internet. It has also been described as "any computer that is fully exposed to attack by being on the public side of the DMZ, unprotected by a firewall or filtering router. Firewalls and routers, anything that provides perimeter access control security can be considered bastion hosts. Other types of bastion hosts can include web, mail, DNS, and FTP servers. Due to their exposure, a great deal of effort must be put into designing and configuring bastion hosts to minimize the chances of penetration." In computing, virtualization or virtualization (sometimes abbreviated v12n, a numeronym) is the act of creating a virtual (rather than actual) version of something, including virtual computer hardware platforms, storage devices, and computer network resources. Virtualization may occur in several elements within a computer system (e.g., hardware virtualization, desktop virtualization, containerization, and/or any other category and subcategory of virtualization known in the art).

SUMMARY

Embodiments of the present invention disclose a computer-implemented method, a computer program product, and a system for re-screening a remote desktop session of a target virtual machine, the computer-implemented method comprising: identifying, on a computer system, an open remote desktop window corresponding to the remote desktop session; determining, by the computer system, whether one or more second remote desktop windows are embedded in the open remote desktop window; responsive to determining, by the computer system, that the one or more second remote desktop windows are embedded in the open remote desktop window, identifying, from the one or more second remote desktop windows, a target remote desktop window associated with the target virtual machine; generating an overlay on the open remote desktop window based on the identification of the target remote desktop window associated with the target virtual machine; capturing activity on a remote desktop screen associated with the generated overlay; and executing the captured activity on the generated overlay.

DETAILED DESCRIPTION

Figure 1A:
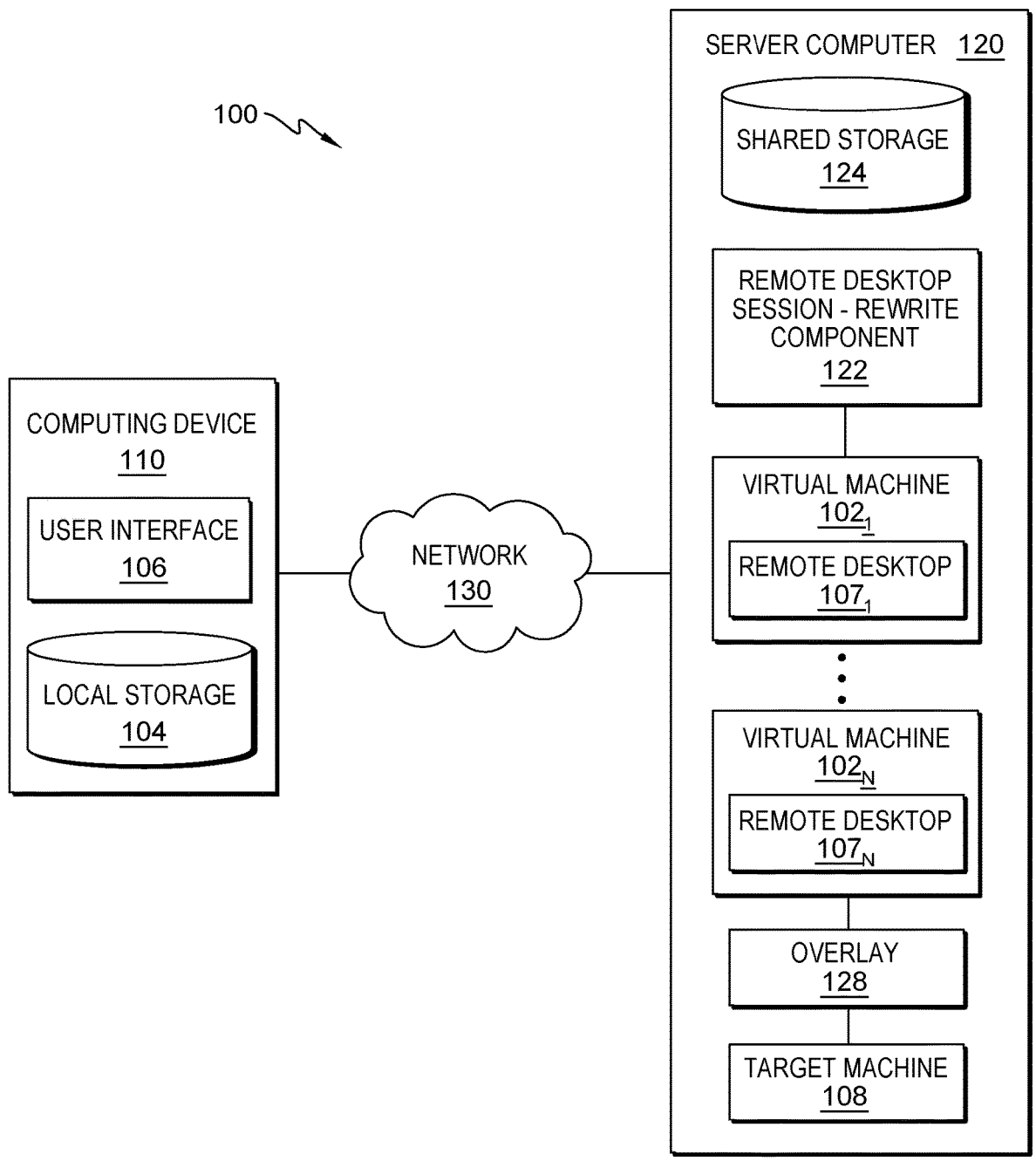
FIG. 1A is a functional block diagram illustrating a distributed data processing environment, in accordance with an embodiment of the present invention.

Embodiments of the present invention recognize that in the virtualization industry, companies use a pattern called "bastion hosts" in order to ensure an increased level of security for their virtual machines and containers. These "bastion hosts" are intermediary virtual machines that company employees are using to gain access to a remote protected network where the target virtual machine exists. Further, embodiments of the present invention recognize that once the user has logged on to the "bastion host", they will open a new remote desktop session and login to another virtual machine from the protected network that the bastion host is offering access to. Embodiments of the present invention recognize that for many large companies, employees use multiple bastion virtual machines to connect to a remote target virtual machine where they are traditionally doing their work. This means that an employee working for an outsourcing company, or a large enterprise will spend a majority of their day connected through a variety of bastion hosts to a target virtual machine. For example, in some enterprise/company engagements where multiple companies are linked by a single contract, the predetermined software developers need to navigate a chain of up to 4 bastion hosts every day to reach the target virtual machine (i.e., development environment).

Embodiments of the present invention recognize that this chain of virtual machine is very confusing for the employee as each machine may have various screen resolutions and the chain of virtual machines may be difficult to navigate due in part to the scrolling through a specific remote desktop window from the chain of virtual machines, or a user attempting to minimize the desktop application running in the target virtual machine accidentally selects one of the bastion host's remote desktop window. Further, embodiments of the present invention recognize that, in many companies, the employees need to pass through multiple chains of remote desktop session daily when the "bastion host" pattern is used for increasing network security in virtual environments. Embodiments of the present invention recognize that the multiple chains make it very difficult to work with multiple remote desktop session opened one after another especially when each virtual machine has different screen resolution, and you need to scroll to see the full screen of the target virtual machine. Thus, Employee satisfaction and productivity are negatively impacted, and this eventually translates into additional costs for the company. Embodiments of the present invention proposes a solution to remove the inconveniences and solve the particular problems introduced by chaining remote desktop sessions without installing additional software on each virtual machine.

Embodiments of the present invention recognize that currently there are no known solutions to the problems stated above. Embodiments of the present invention specifically address and solve the problems/issues stated above with a unique and novel approach. Embodiments of the present invention solve the particular problems described above by re-screening a remote desktop session of a target virtual machine. Further, Embodiments of the present invention solve the particular problems described above and improve the art by (i) identifying, on a computer system, an open remote desktop window corresponding to the remote desktop session, (ii) determining, by the computer system, whether one or more second remote desktop windows are embedded in the open remote desktop window, (iii) identifying, from the one or more second remote desktop windows, a target remote desktop window associated with the target virtual machine, in response to determining, by the computer system, that the one or more second remote desktop windows are embedded in the open remote desktop window, (iv) generating an overlay on the open remote desktop window, wherein the overlay comprises the target remote desktop window and displays a remote desktop screen corresponding to the target virtual machine based on the identification of the target remote desktop window associated with the target virtual machine, (v) capturing activity on the remote desktop screen associated with the generated overlay, wherein the captured activity is transmitted to the target virtual machine for interacting with the target virtual machine, (vi) removing the one or more second remote desktop windows not associated with the target virtual machine, wherein the removed one or more second desktop windows are intermediate between the open remote desktop window and the target remote desktop window, (vii) using a remote desktop plugin to identify the open remote desktop window, and (viii) using machine learning algorithms associated with the remote desktop plugin to determine whether the one or more second remote desktop windows are embedded in the open remote desktop window.

Implementation of embodiments of the invention may take a variety of forms, and exemplary implementation details are discussed subsequently with reference to the Figures (i.e., FIG. 1A-FIG. 5).

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 5.

User interface (interface) 106 provides an interface to remote desktop session—rewrite (RDS-R) component 122. Computing device 110, via user interface 106, may enable a user and/or a client to interact with RDS-R component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. Interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 5. In some embodiments server computer 120 may represent a plurality of server computers.

Each of shared storage 124 and local storage 104 may be a data/knowledge repository and/or a database that may be written and/or read by one or a combination of RDS-R component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of RDS-R component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 5. The primary database, also referred to as primary storage device, may be one or more of any type of disk storage known in the art. The secondary database, also referred to as secondary storage device, may be one or more any type of tape storage known in the art.

In the depicted embodiment, virtual machine $102_1$-virtual machine $102_N$, collectively referred to as virtual machine(s) 102, execute on server computer 120, wherein N represents a positive integer, and accordingly the number of scenarios implemented in a given embodiment of the present invention is not limited to those depicted in FIG. 1A. In various embodiments, not depicted in FIG. 1A, virtual machine(s) 120 may execute on a plurality of server computers 120 and/or on a plurality of computing devices 110. In some embodiments, virtual machine(s) 120 may be located and/or execute anywhere within distributed data processing environment 100 as long as virtual machine(s) 120 are connected to and/or communicates with, computing device 110, and/or server computer 120, via network 130. In the depicted embodiment, remote desktop $107_1$-$107_N$, collectively referred to as remote desktop(s) 107, execute on server computer 120, via virtual machine(s) 102, wherein N represents a positive integer, and accordingly the number of scenarios implemented in a given embodiment of the present invention is not limited to those depicted in FIG. 1A. In various embodiments, remote desktop(s) 107 may be located and/or executed anywhere within distributed data processing environment 100 as long as remote desktop(s) 107 are connected to and/or communicate with, computing device 110, virtual machine(s) 102, and/or server computer 120, via network 130.

In the depicted embodiment, overlay 128 and target machine 108 each execute on server computer 120. In other embodiments, overlay 128 and target machine 108 may each be executed on computing device 110. In various embodiments of the present invention, not depicted in FIG. 1A, overlay 128 and target machine 108 each may each execute on a plurality of server computers 120 and/or on a plurality of computing devices 110. In some embodiments, overlay 128 and target machine 108 may each be located and/or executed anywhere within distributed data processing environment 100 as long as overlay 128 and target machine 108 are each connected to and/or communicate with, computing device 110, and/or server computer 120, via network 130.

In the depicted embodiment, RDS-R component 122 is executed on server computer 120. In other embodiments, RDS-R component 122 may be executed on computing device 110. In various embodiments of the present invention, not depicted in FIG. 1A, RDS-R component 122 may execute on a plurality of server computers 120 and/or on a plurality of computing devices 110. In some embodiments, RDS-R component 122 may be located and/or executed anywhere within distributed data processing environment 100 as long as RDS-R component 122 is connected to and/or communicates with, computing device 110, and/or server computer 120, via network 130.

RDS-R component 122 is a remote desktop solution plugin can identify an open remote desktop window and use artificial intelligence to determine if there is another remote desktop window visible inside the first desktop window. In the event that there is a good probability for the embedded window to exist, then an overlay will be added on top of the first window. In various embodiments, if RDS-R component 122 determines there is one or more secondary remote desktop windows inside the first desktop window then RDS-R component 122 generates and implement an overlay over the first window. The overlay may stream the picture from the second remote desktop in maximized mode so that the main window appears as it is displaying just one remote desktop session. In various embodiments, like that depicted in FIG. 1B, where there are multiple remote desktop windows displayed inside of another RDS-R component 122 uses the last virtual desktop (e.g., target virtual machine 108) as an overlay source. For example, in FIG. 1B, RDS-R component 122 and remote desktop $107_1$ each execute on computing device 110 and are each interacting with user 140 (e.g., system administrator).

Figure 1B:
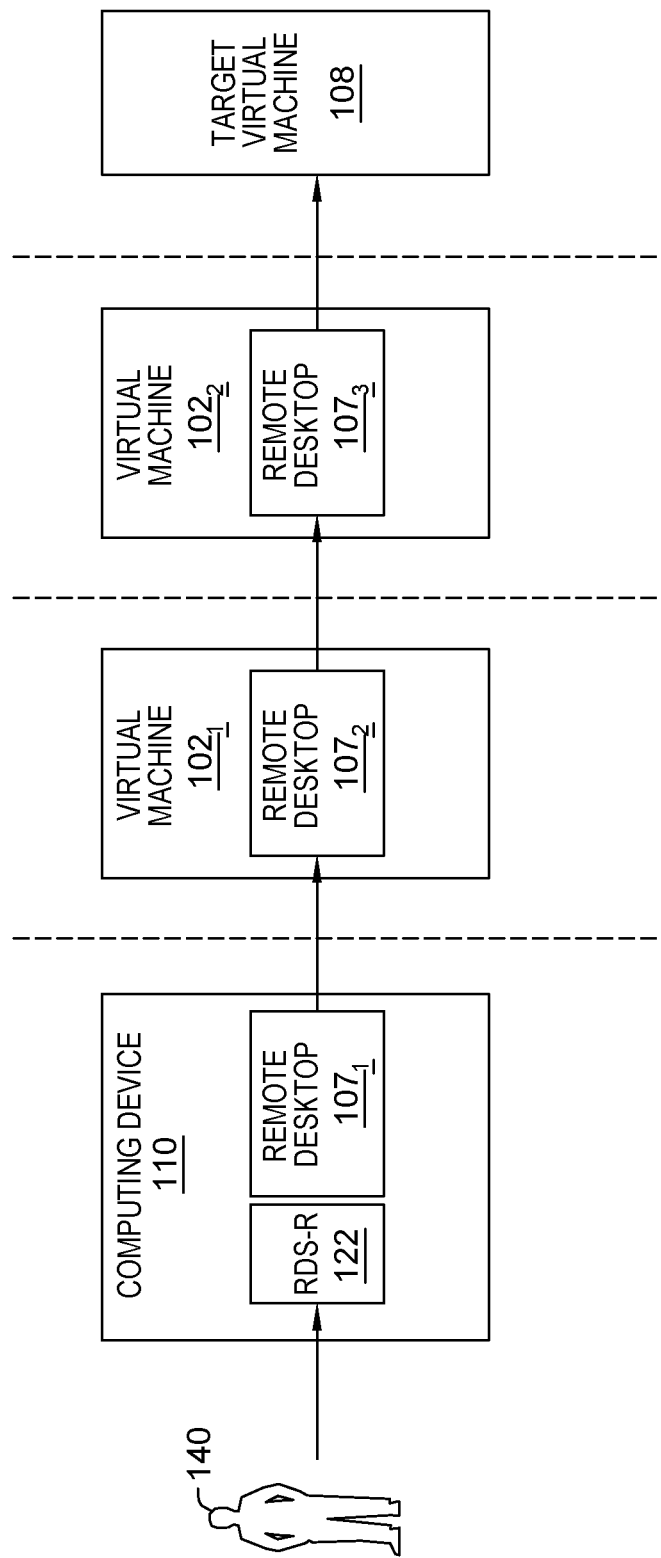
FIG. 1B is a functional block diagram illustrating a distributed data processing environment of a remote desktop session—rewrite component, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, remote desktop $107_2$ executing on virtual machine $102_1$ is displayed inside remote desktop $107_1$ and remote desktop $107_3$ executing on virtual machine $102_2$ is displayed within remote desktop $107_2$. In this example, responsive to identifying a plurality of remote desktops (e.g., remote desktop $107_2$ and remote desktop $107_3$) operating and/or displaying within one or more remote desktops, RDS-R component 122 generates and overlays target virtual machine 108 to encompass remote desktop $107_1$, remote desktop $107_2$, and remote desktop $107_3$. In various embodiments, to recognize an embedded window, RDS-R component 122 uses or executes on premise convolutional neural network 131, wherein on premise convolutional neural network 131 is pre-trained to recognize the title bar of a remote desktop session. In some embodiments, where two or more bastion hosts comprise different resolutions, RDS-R component 122 displays one scroll bar that enables the overlay to scroll just the target virtual machine.

In various embodiments, RDS-R component 122 may be a visual recognition component that is installed on computing device 110, wherein RDS-R component 122 comprises overlay 128, wherein overlay 128 can dynamically resize one or more remote desktop windows depending on the action of a user, wherein the action taken by the user is performed on a remote desktop window or a local desktop window. In various embodiments, RDS-R component 122 automatically detects embedded remote desktop session and delivers/executes the results without installing software on the bastion virtual machines.

Figure 2:
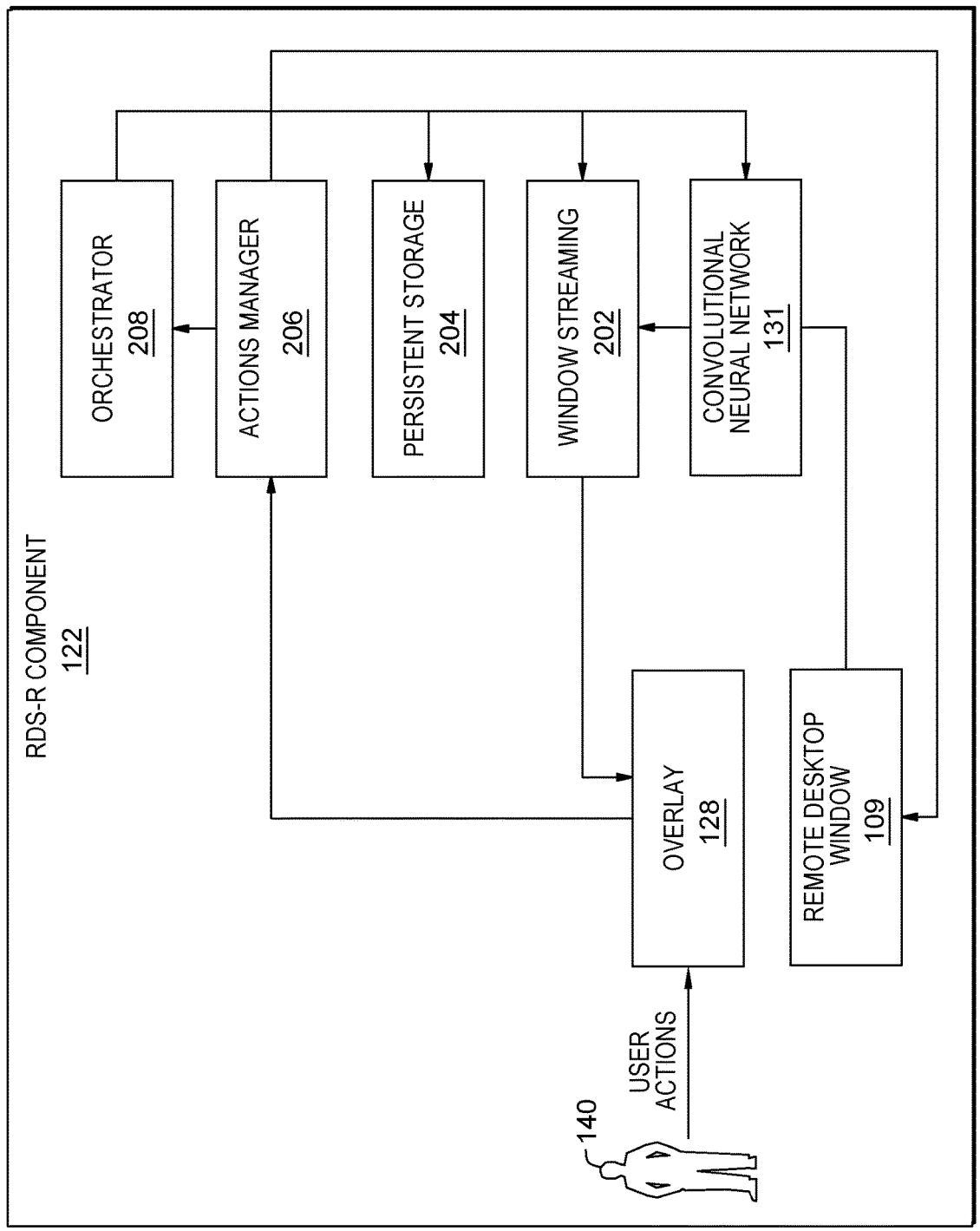
FIG. 2 illustrates operational steps of the remote desktop session—rewrite component, on a server computer within the distributed data processing environment of FIG. 1A and FIG. 1B, for re-screening a remote desktop session of a target virtual machine, in accordance with an embodiment of the present invention.

FIG. 2 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, RDS-R component 122 comprises remote desktop window 109, overlay 128, convolution neural network 131, window streaming 202, persistent storage 204, actions manager 206, and orchestrator component (orchestrator) 208. Remote desktop window 109 is the remote window on top of which overlay 128 is displayed by RDS-R component 122 if an addressed problem is identified on the session. An addressed problem may be defined as a situation/event where there are embedded remote desktop session windows. For example, an addressed problem occurs when there is a new remote desktop session window opened by the user into an existing remote desktop session window, which results in there being two windows, one displayed inside another (i.e., picture in picture). Overlay 128 displays visuals (e.g., text and/or images) transmitted by the RDS-R component 122 at a predetermined interval to enable user 140 to see the Remote Desktop screen (e.g., remote desktop window 109) of the target virtual machine and enable the capturing of the actions performed by user 140 (clicks/selections, cursor movement, and keystrokes). In some embodiments, overlay 128 displays visuals (e.g., text and/or images) transmitted by the RDS-R component 122 at a fast interval (e.g., 200 milliseconds).

In various embodiments, if user 140 interacts with the mouse or trackpad (e.g., clicks the mouse), then overlay 128 identifies the coordinates of the mouse click and transmit the coordinates of the mouse click to the orchestrator 208, wherein orchestrator 208 generates a similar click (left or right) directly on remote desktop window 109 by adding any additional margins. The generated user action executed on remote desktop window 109 enables the user sees overlay 128 as a regular remote desktop window thus improving the overall user experience. Overlay 128 may display the picture stream provided by window streaming component (window streaming 202). In various embodiments, if a scroll operation is executed in remote desktop window 109 and/or identified by actions manager 206 then persistent storage 204 retrieves and/or receives information related to the amount of identified scrolling and estimates the impact on the embedded remote desktop screens (e.g., remote desktop window 109) in order for the overlay to properly render the target virtual machine window.

Orchestrator 208 coordinates the overall activity and facilitates identified and/or received activity registered/input by user 140. Orchestrator 208 may communicate with persistent storage 204 to identify, retrieve and/or store a solution to maintain configuration data (like enable/disable) and coordinate the data flow between the components. Window streaming 202 may continuously execute a predetermined function in at least a portion of remote desktop window 109. For example, window streaming 202 continuously executes the "Print Screen" function on a section of the remote desktop window 109 that is facilitated by orchestrator 208 and streams the "Print Screen" information to overlay 128. In this example, the area which is captured by the "Print Screen" function corresponds to the target virtual machine remote desktop session without the surrounding box given by the window, wherein orchestrator 208 correctly determines the captured area, via convolutional neural network 131. Action manager 206 manages input from user 140 on overlay 128 by re-executing the same actions on the root/primary remote desktop window (e.g., remote desktop window 109). In various embodiments. to ensure that the user input is executed at the right location(s), action manager 206 adds a fixed margin at the X-axis and Y-axis of each click to count for the window titles and related elements of the intermediary bastion virtual machines embedded in remote desktop window 109. In some embodiments, the margin is predetermined and in other embodiments the margin is determine by convolution neural network 131. Convolutional neural network 131 is trained for visual recognition. In various embodiments, convolutional neural network 131 and can identify on a print screen of the remote desktop window the location of one or more intermediary virtual machine windows. In various embodiments, convolution neural network 131 comprises a network layer that enables the extraction of positioning features of the identified embedded remote desktop by recognizing the specific window titles.

Figure 3:
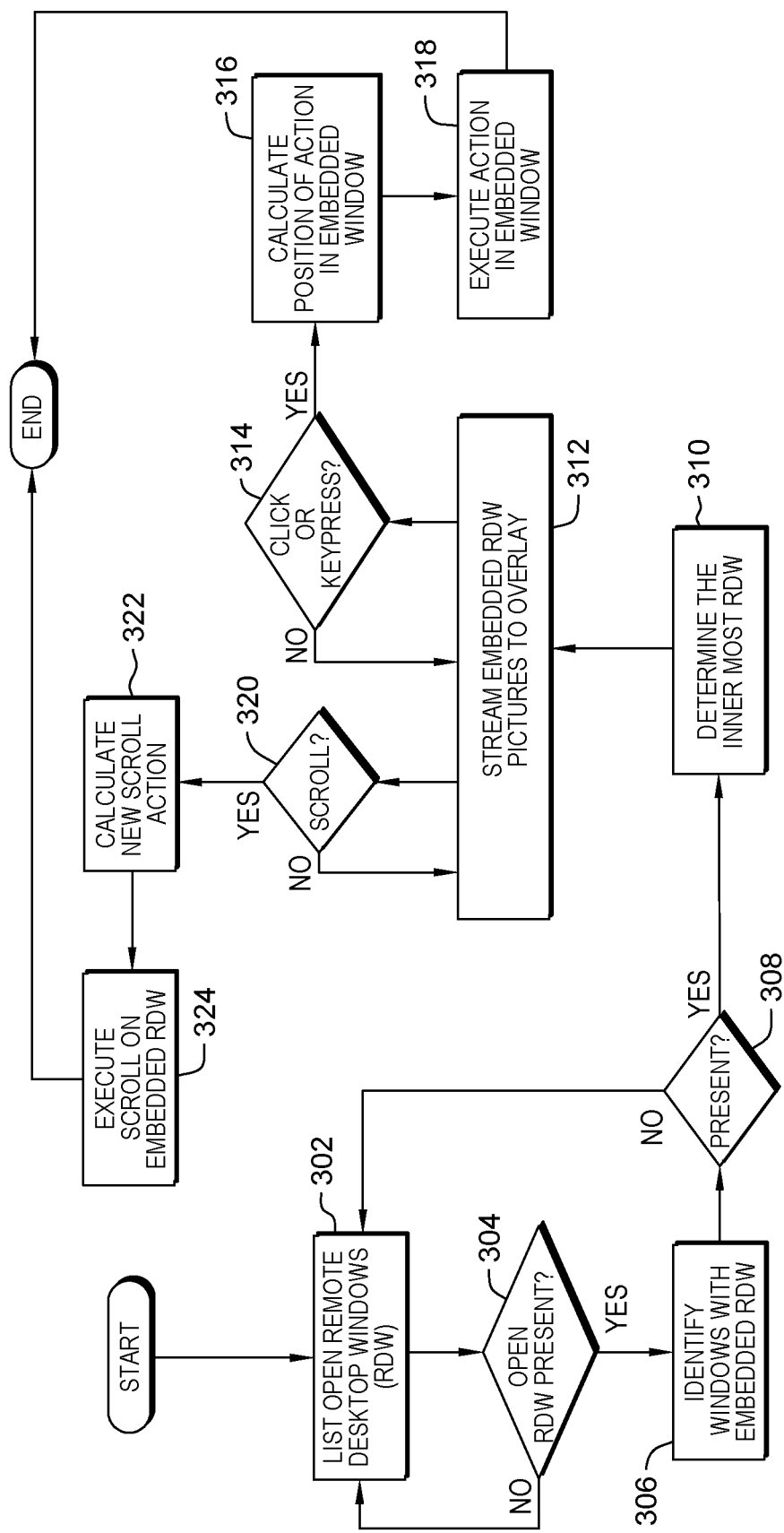
FIG. 3 illustrates operational steps of the remote desktop session—rewrite component, on a server computer within the distributed data processing environment of FIG. 1A and FIG. 1B, for enhancing server virtualization through host sessions, in accordance with an embodiment of the present invention.

FIG. 3 illustrates operational steps of RDS-R component 122, generally designated 300, in communication with server computer 120, within distributed data processing environment 100 of FIG. 1A, for enhancing server virtualization through host sessions, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, RDS-R component 122 lists open remote desktop windows. In various embodiments, RDS-R component 122 list one or more remote desktop windows in a displayed prompt to a user. In some embodiments, the displayed prompt is a responsive prompt.

In step 304, RDS-R component 122 determines if the listed remote desktop windows are open. In various embodiments, RDS-R component 122 determines if one or more listed remote desktop windows are open. In the depicted embodiment, if RDS-R component 122 determines there are no open remote desktop windows present, (No step), then RDS-R component 122 continuously monitors computing device 110 for activity in one or more virtual machines by repeating step 302. However, in the depicted embodiment, if RDS-R component 122 determines there are one or more remote desktop windows open on computing device 110, (Yes step), then RDS-R component 122 advances to step 306.

In step 306, RDS-R component 122 identifies a window with an embedded remote desktop window. In various embodiments, RDS-R component 122 identifies one or more windows with one or more embedded remote desktop windows.

In step 308, RDS-R component 122 determines if the embedded remote desktop windows are open. In various embodiments, the convolutional neural network will review and identify the title of a remote desktop window. Remote desktop windows are known to have similar title bars to enable recognized by the user or system. Thus, in various embodiments, if the convolutional neural network is trained, the convolutional neural network can identify, with a high level of confidence, whether an open window is used for "remote desktop" purpose or not, wherein a high level of confidence means a confidence of at least 70%. In the depicted embodiment, if RDS-R component 122 determines no remote desktop windows are open, (Not step), then RDS-R component 122 advances to step 302. However, in the depicted embodiment, if RDS-R component 122 identifies one or more remote desktop windows are open, (Yes step), then RDS-R component 122 advances to step 310.

In step 310, RDS-R component 122 identifies the inner most remote desktop window in a chain of remote desktop sessions. In various embodiments, RDS-R component 122 identifies the inner most remote desktop window in a chain of virtual machines displaying a plurality of remote desktop windows. In various embodiments, the inner most remote desktop window in a chain on remote desktop session window openings may be defined as the last window opened by the user. For example, if two remote desktop windows are each is inside another (because a user opened the first window then inside the first window the user opens a second remote desktop session window, then the inner most remote desktop window is the second remote desktop session window.

In step 312, RDS-R component 122 streams embedded remote desktop window images to an overlay. In various embodiments, RDS-R component 122 streams one or more remote desktop window images to a generated overlay, wherein the overlay is the identified inner most remote desktop window (e.g., target virtual machine 108).

In step 314, RDS-R component 122 determines if a cursor (mouse) click or keypress are executed. In the depicted embodiment, if RDS-R component 122 determines no cursor click or keypress/stroke are executed, (Not step), then RDS-R component 122 repeats step 312. However, in the depicted embodiment, if RDS-R component 122 identifies one or more cursor clicks or keypress/strokes are executed, (Yes step), then RDS-R component 122 advances to step 316.

In step 316, RDS-R component 122 calculates a position of identified action in an embedded window. In various embodiments, RDS-R component 122 calculates the position of one or more identified actions in the embedded window (e.g., one or more cursor clicks or keystrokes).

In step 318, RDS-R component 122 executes the identified action in the embedded window. In various embodiments, RDS-R component 122 executes the identified action in the embedded window through the generated overlay on the inner most remote desktop window.

In step 320, RDS-R component 122 determines if a scroll function has been executed. In the depicted embodiment, if RDS-R component 122 determines no scroll function has been executed, (Not step), then RDS-R component 122 repeats step 312. However, in the depicted embodiment, if RDS-R component 122 identifies the scroll function has been executed, (Yes step), then RDS-R component 122 advances to step 322.

In step 322, RDS-R component 122 calculates a new scroll action for the identified scroll function. In various embodiments, RDS-R component 122 a new scroll action for the identified scroll function to be implemented on the generated overlay.

In step 324, RDS-R component 122 executes the newly calculated scroll function in the generated overlay. In various embodiments, RDS-R component 122 executes the newly calculated scroll function in the generated overlay.

Figure 4:
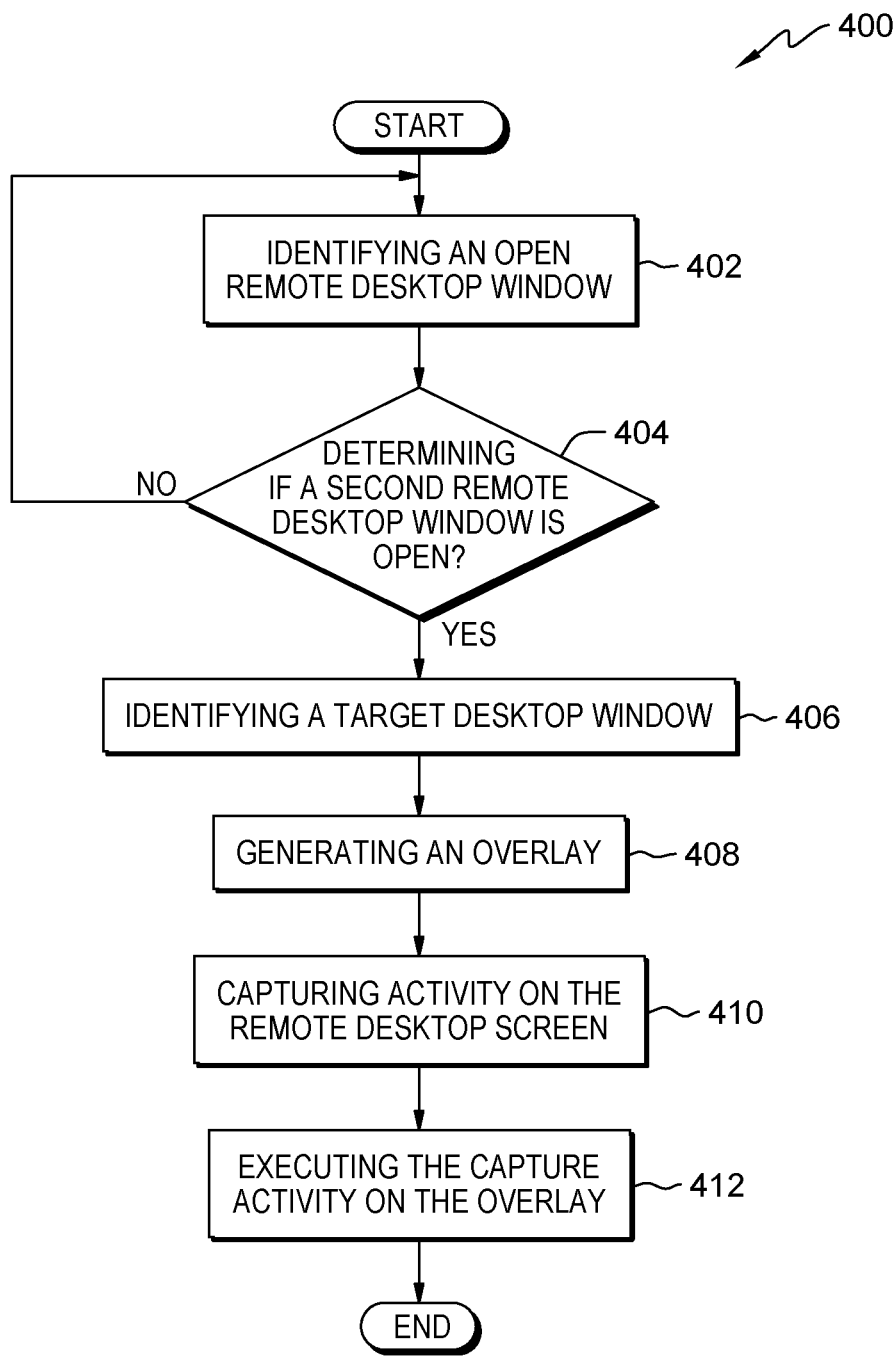
FIG. 4 illustrates operational steps of the remote desktop session—rewrite component, on a server computer within the distributed data processing environment of FIG. 1A and FIG. 1B, for re-screening a remote desktop session of a target virtual machine, in accordance with an embodiment of the present invention.

FIG. 4 illustrates operational steps of component 122, generally designated 400, in communication with server computer 120, within distributed data processing environment 100 of FIG. 1A, for re-screening a remote desktop session of a target virtual machine, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, RDS-R component 122 identifies an open remote desktop window. In various embodiments, RDS-R component 122 identifies, on a computer system, an open remote desktop window corresponding to the remote desktop session.

In step 404, RDS-R component 122 determines if a second remote desktop window is open. In the depicted embodiment, if RDS-R component 122 determines there are no second remote desktop windows embedded in the identified open remote desktop window, (No step), then RDS-R component 122 repeats step 402. However, in the depicted embodiment if RDS-R component 122 determines, by the computer system, there are one or more second remote desktop windows embedded in the open remote desktop window, (Yes step), then RDS-R component 122 advances to step 406.

In step 406, RDS-R component 122 identifies a target desktop window. In various embodiments, responsive to determining, by the computer system, that the one or more second remote desktop windows are embedded in the open remote desktop window, RDS-R component 122 identifies, based on the one or more second remote desktop windows, a target remote desktop window associated with a target virtual machine.

In step 408, RDS-R component 122 generating an overlay. In various embodiments, RDS-R component 122 generates an overlay on the open remote desktop window based on the identification of the target remote desktop window associated with the target virtual machine, wherein the overlay comprises the target remote desktop window and displays a remote desktop screen corresponding to the target virtual machine.

In step 410, RDS-R component 122 captures an activity executed on the remote desktop screen. In various embodiments, RDS-R component 122 captures activity (e.g., user activity) on the remote desktop screen associated with the generated overlay, wherein the captured activity is transmitted to the target virtual machine for interacting with the target virtual machine.

In step 412, RDS-R component 122 executes the captured activity on the overlay. In various embodiments, RDS-R component 122 executes the one or more captured activity executed on the remote desktop screen in the generated overlay.

Figure 5:
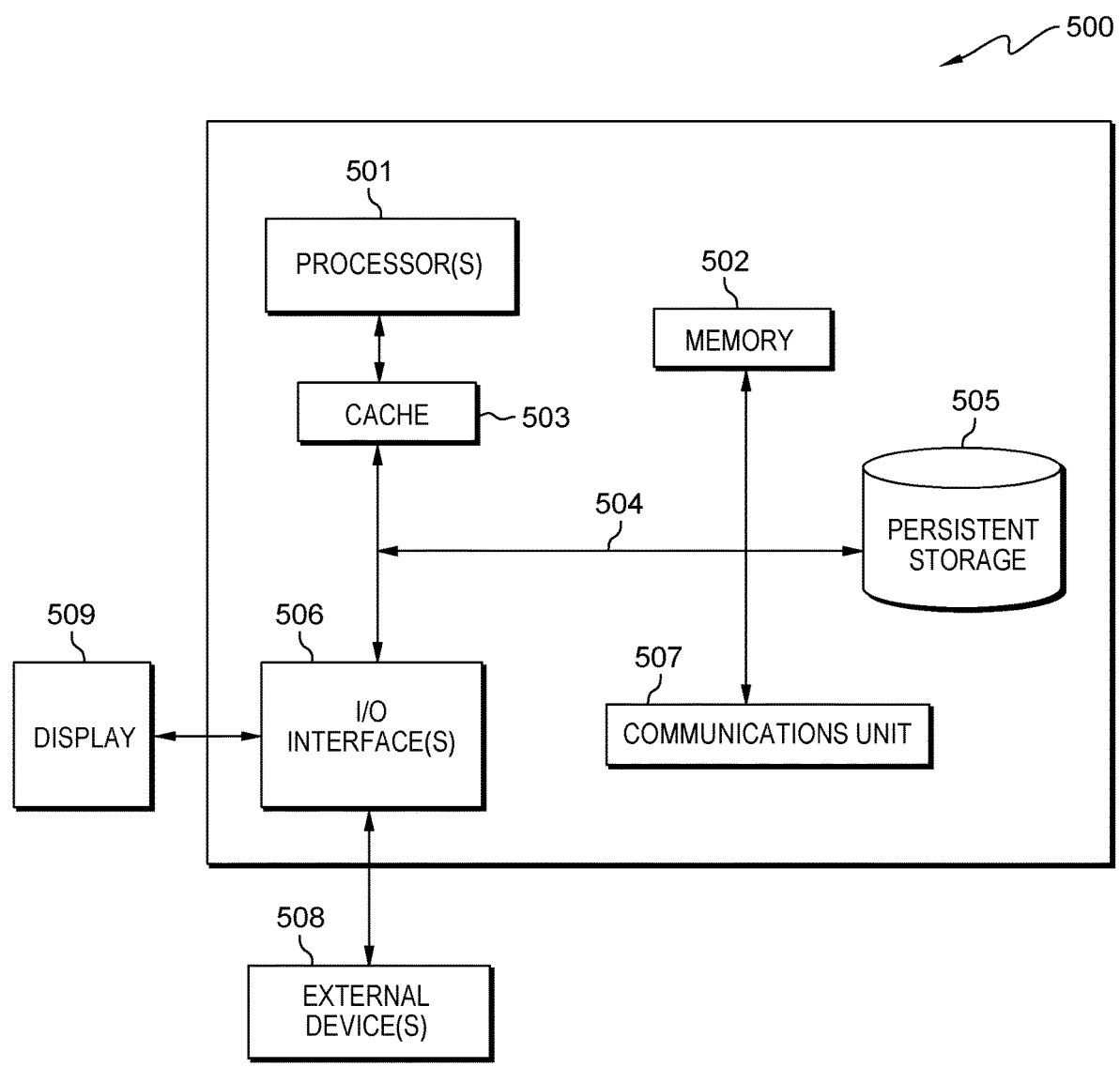
FIG. 5 depicts a block diagram of components of the server computer executing remote desktop session—rewrite component within the distributed data processing environment of FIG. 1A and FIG. 1B, in accordance with an embodiment of the present invention.

FIG. 5 depicts a block diagram of components of server computer 120 within distributed data processing environment 100 of FIG. 1A, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 depicts computer system 500, where server computing 120 represents an example of computer system 500 that includes RDS-R component 122. The computer system includes processors 501, cache 503, memory 502, persistent storage 505, communications unit 507, input/output (I/O) interface(s) 506, display 509, external device(s) 508 and communications fabric 504. Communications fabric 504 provides communications between cache 503, memory 502, persistent storage 505, communications unit 507, and input/output (I/O) interface(s) 506. Communications fabric 504 may be implemented with any architecture designed for passing data and/or control information between processors (such as microprocessors, communications, and network processors, etc.), system memory, peripheral devices, and any other hardware components within a system. For example, communications fabric 504 may be implemented with one or more buses or a crossbar switch.

Memory 502 and persistent storage 505 are computer readable storage media. In this embodiment, memory 502 includes random access memory (RAM). In general, memory 502 may include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 enables for input and output of data with other devices that may be connected to each computer system. For example, I/O interface 506 may provide a connection to external devices 508 such as a keyboard, keypad, a touch screen, and/or some other suitable input device. External devices 508 may also include portable computer readable storage media such as, for example, thumb drives, portable optical or magnetic disks, and memory cards. Software and data used to practice embodiments of the present invention may be stored on such portable computer readable storage media and may be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for re-screening a remote desktop session of a target virtual machine, the computer-implemented method comprising:
    identifying, on a computer system, an open remote desktop window corresponding to the remote desktop session, wherein identifying the open remote desktop window comprises:
        executing an on premise convolutional neural network, wherein the on premise convolutional neural network is pre-trained to recognize a title bar of a remote desktop session;

determining, by an artificial intelligent system, whether one or more second remote desktop windows are embedded in the open remote desktop window;

responsive to determining, by the artificial intelligent system, that the one or more second remote desktop windows are embedded in the open remote desktop window, identifying, from the one or more second remote desktop windows, a target remote desktop window associated with the target virtual machine;

generating an overlay on the open remote desktop window based on the identification of the target remote desktop window associated with the target virtual machine, wherein the overlay streams a picture from the second remote desktop in maximized mode so that the open remote desktop window appears as it is displaying just one remote desktop session;

capturing activity on a remote desktop screen associated with the generated overlay; and executing the captured activity on the generated overlay.

2. The computer-implemented method of claim 1, wherein the overlay comprises the target remote desktop window and displays the remote desktop screen corresponding to the target virtual machine.

3. The computer-implemented method of claim 1, wherein the captured activity is transmitted to the target virtual machine for interacting with the target virtual machine.

4. The computer-implemented method of claim 1, further comprising:

removing the one or more second remote desktop windows not associated with the target virtual machine, wherein the removed one or more second desktop windows are intermediate between the open remote desktop window and the target remote desktop window.

5. The computer-implemented method of claim 1, further comprising:

identifying, by a remote desktop plugin, the open remote desktop window; and determining, by machine learning algorithms associated with the remote desktop plugin, that the one or more second remote desktop windows are embedded in the open remote desktop window.

6. The computer-implemented method of claim 1, wherein the overlay comprises controlling components to control the target virtual machine.

7. The computer-implemented method of claim 1, further comprising:

streaming one or more remote desktop window images to the generated overlay, wherein the overlay is an identified inner most remote desktop window.

8. A computer system for re-screening a remote desktop session of a target virtual machine, the computer system comprising:

one or more computer processors;

one or more computer readable storage devices;

program instructions stored on the one or more computer readable storage devices for execution by at least one of the one or more computer processors, the stored program instructions comprising:

program instructions to identify, on a computer system, an open remote desktop window corresponding to the remote desktop session, wherein identifying the open remote desktop window comprises:

program instructions to execute an on premise convolutional neural network, wherein the on premise convolutional neural network is pre-trained to recognize a title bar of a remote desktop session;

program instructions to determine, by an artificial intelligent system, whether one or more second remote desktop windows are embedded in the open remote desktop window;

responsive to determining, by the artificial intelligent system, that the one or more second remote desktop windows are embedded in the open remote desktop window, program instructions to identify, from the one or more second remote desktop windows, a target remote desktop window associated with the target virtual machine;

program instructions to generate an overlay on the open remote desktop window based on the identification of the target remote des ktop window associated with the target virtual machine, wherein the overlay streams a picture from the second remote desktop in maximized mode so that the open remote desktop window appears as it is displaying just one remote desktop session;

responsive identifying two or more bastion hosts comprising different resolutions, program instructions to display one scroll bar that enables the generated overlay to scroll just the target virtual machine;

program instructions to capture activity on a remote desktop screen associated with the generated overlay; and program instructions to execute the captured activity on the generated overlay.

9. The computer system of claim 8, wherein the overlay comprises the target remote desktop window and displays the remote desktop screen corresponding to the target virtual machine.

10. The computer system of claim 8, wherein the captured activity is transmitted to the target virtual machine for interacting with the target virtual machine.

11. The computer system of claim 8, further comprising:

program instructions to remove the one or more second remote desktop windows not associated with the target virtual machine, wherein the removed one or more second desktop windows are intermediate between the open remote desktop window and the target remote desktop window.

12. The computer system of claim 8, further comprising:

program instructions to identify, by a remote desktop plugin, the open remote desktop window; and program instructions to determine, by machine learning algorithms associated with the remote desktop plugin, that the one or more second remote desktop windows are embedded in the open remote desktop window.

13. The computer system of claim 8, wherein the overlay comprises controlling components to control the target virtual machine.

14. The computer system of claim 8, further comprising:

program instructions to stream one or more remote desktop window images to the generated overlay, wherein the overlay is an identified inner most remote desktop window.

15. A computer program product for re-screening a remote desktop session of a target virtual machine, the computer program product comprising:

one or more computer readable storage media and program instructions stored on the one or more computer readable storage media, the stored program instructions comprising:

program instructions to identify, on a computer system, an open remote desktop window corresponding to the remote desktop session, wherein identifying the open remote desktop window comprises:

program instructions to execute an on premise convolutional neural network, wherein the on premise convolutional neural network is pre-trained to recognize a title bar of a remote desktop session;

program instructions to determine, by an artificial intelligent system, whether one or more second remote desktop windows are embedded in the open remote desktop window;

responsive to determining, by the artificial intelligent system, that the one or more second remote desktop windows are embedded in the open remote desktop window, program instructions to identify, from the one or more second remote desktop windows, a target remote desktop window associated with the target virtual machine;

program instructions to generate an overlay on the open remote desktop window based on the identification of the target remote desktop window associated with the target virtual machine, wherein the overlay streams a picture from the second remote desktop in maximized mode so that the open remote desktop window appears as it is displaying just one remote desktop session;

responsive identifying two or more bastion hosts comprising different resolutions, program instructions to display one scroll bar that enables the generated overlay to scroll just the target virtual machine;

program instructions to capture activity on a remote desktop screen associated with the generated overlay; and program instructions to execute the captured activity on the generated overlay.

16. The computer program product of claim 15, wherein the overlay comprises the target remote desktop window and displays the remote desktop screen corresponding to the target virtual machine, and wherein the captured activity is transmitted to the target virtual machine for interacting with the target virtual machine.

17. The computer program product of claim 15, further comprising:

program instructions to remove the one or more second remote desktop windows not associated with the target virtual machine, wherein the removed one or more second desktop windows are intermediate between the open remote desktop window and the target remote desktop window.

18. The computer program product of claim 15, further comprising:

program instructions to identify, by a remote desktop plugin, the open remote desktop window; and program instructions to determine, by machine learning algorithms associated with the remote desktop plugin, that the one or more second remote desktop windows are embedded in the open remote desktop window.

19. The computer program product of claim 15, wherein the overlay comprises controlling components to control the target virtual machine.

20. The computer program product of claim 15, further comprising:

program instructions to stream one or more remote desktop window images to the generated overlay, wherein the overlay is an identified inner most remote desktop window.

* * * * *